(12) United States Patent
Yang et al.

(10) Patent No.: US 12,547,274 B2
(45) Date of Patent: Feb. 10, 2026

(54) DISPLAY APPARATUS, METHOD OF DRIVING THE DISPLAY APPARATUS AND DISPLAY SYSTEM INCLUDING THE DISPLAY APPARATUS

(71) Applicant: SAMSUNG DISPLAY CO., LTD., Yongin-si (KR)

(72) Inventors: Gunwoo Yang, Yongin-si (KR); Taeho Kang, Yongin-si (KR); Siwoo Kim, Yongin-si (KR); Haeryeong Park, Yongin-si (KR); Keunhee Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/932,034

(22) Filed: Oct. 30, 2024

(65) Prior Publication Data

US 2025/0156007 A1    May 15, 2025

(30) Foreign Application Priority Data

Nov. 9, 2023    (KR) ........................ 10-2023-0154897

(51) Int. Cl.
*G06F 3/041* (2006.01)
*G09G 3/3225* (2016.01)

(52) U.S. Cl.
CPC ........ *G06F 3/04166* (2019.05); *G06F 3/0412* (2013.01); *G06F 3/04164* (2019.05); *G09G 3/3225* (2013.01); *G09G 2354/00* (2013.01)

(58) Field of Classification Search
CPC ............. G06F 3/04166; G06F 3/04164; G06F 3/0412; G09G 3/3225; G09G 2354/00
See application file for complete search history.

(56) References Cited

U.S. PATENT DOCUMENTS

| | | | |
|---|---|---|---|
| 11,193,992 B2 | 12/2021 | Yang et al. | |
| 2022/0334700 A1* | 10/2022 | Lim | G06F 3/04164 |
| 2023/0147349 A1* | 5/2023 | Park | G09G 5/006 |
| | | | 345/174 |
| 2024/0215356 A1* | 6/2024 | Sin | H10K 59/873 |

FOREIGN PATENT DOCUMENTS

| | | |
|---|---|---|
| KR | 10-2022-0064240 | 5/2022 |
| KR | 10-2022-0164431 | 12/2022 |
| KR | 10-2020-0082506 | 11/2023 |

* cited by examiner

*Primary Examiner* — Peter D McLoone
(74) *Attorney, Agent, or Firm* — F. CHAU & ASSOCIATES, LLC

(57) ABSTRACT

A display apparatus includes a display panel, a panel driver, a touch driving output layer of a touch panel and touch driver. The display driver outputs a panel driving signal to the display panel. The touch driver outputs a touch driving signal to the touch driving signal output layer. The display apparatus determines a driving frequency of the display panel according to the panel driving signal and synchronizes a frequency of the touch driving signal with the driving frequency.

20 Claims, 7 Drawing Sheets

DISPLAY APPARATUS, METHOD OF DRIVING THE DISPLAY APPARATUS AND DISPLAY SYSTEM INCLUDING THE DISPLAY APPARATUS

CROSS-REFERENCE TO RELATED APPLICATION(S)

This patent application claims priority under 35 U.S.C. § 119 to Korean Patent Application No. 10-2023-0154897, filed on Nov. 9, 2023 in the Korean Intellectual Property Office KIPO, the disclosure of which is incorporated by reference in its entirety herein.

1. TECHNICAL FIELD

Embodiments of the present inventive concept are directed to a display apparatus, a method of driving the display apparatus and display system including the same. More particularly, embodiments of the present inventive concept are directed to a display apparatus for reducing a horizontal line defect and a stain defect of a display panel.

2. DESCRIPTION OF RELATED ART

Flat panel displays are thin, lightweight display devices used in many modern electronic devices such as televisions, computer monitors, smartphones, and tablets. Unlike older display technologies such as cathode ray tubes (CRTs), flat panel displays are much slimmer and consume less power. Examples of flat panel displays include liquid crystal displays (LCDs), light-emitting diode displays (LEDs) and organic light-emitting diode displays (OLEDs).

A flat panel display includes a display panel and a panel driver. The display panel displays an image based on input image data. The display panel includes a plurality of gate lines, a plurality of data lines and a plurality of pixels. The panel driver includes a gate driver, a data driver and a driving controller. The gate driver outputs gate signals to the gate lines. The data driver outputs data voltages to the data lines. The driving controller controls an operation of the gate driver and an operation of the data driver. The panel driver may control the display panel with a panel driving signal.

The flat panel display may further include a touch panel, which is an input device that allows users to interact directly which what is displayed, rather than using a pointing device such as a mouse or a trackpad. Examples of touch panels include resistive touch panels and capacitive touch panels. The touch panel may be controlled with a touch driving signal.

A frequency of the panel driving signal and the touch driving signal may be unsynchronized, so that a coupling voltage between the touch driving signal and a data voltage of the display panel varies according to an area in the display panel. Accordingly, a horizontal line defect or a stain defect may be observed.

SUMMARY

Embodiments of the present inventive concept provide a display apparatus for reducing a horizontal line defect or a stain defect of a display panel by synchronizing a driving frequency of the display panel and a frequency of a touch driving signal.

Embodiments of the present inventive concept also provide a method of driving the display apparatus.

Embodiments of the present inventive concept also provide a display system including the display apparatus.

In an embodiment of a display apparatus according to the present inventive concept, the display apparatus includes a display panel, a panel driver, a touch driving output layer of a touch panel and a touch driver. The display driver outputs a panel driving signal to the display panel. The touch driver outputs a touch driving signal to the touch driving signal output layer. The display apparatus determines a driving frequency of the display panel from the panel driving signal and synchronizes a frequency of the touch driving signal with the driving frequency.

In an embodiment, the frequency of the touch driving signal may be N times the driving frequency. The N may be a positive integer.

In an embodiment, the display panel may be disposed on the touch driving signal output layer.

In an embodiment, the display apparatus may further include a touch sensing layer. The touch sensing layer may be disposed on the display panel.

In an embodiment, the touch driving signal may have a periodic function.

In an embodiment, the periodic function may be a sinewave function.

In an embodiment, the touch driving signal output layer may include a touch driving line. The touch driver may output the touch driving signal to the touch driving line.

In an embodiment, the display apparatus may further include a first layer and a second layer. The touch driving line is disposed on the first layer. The second layer may be disposed on the touch driving line.

In an embodiment, the first layer and the second layer may include an organic material.

In an embodiment, the touch driving signal output layer may include a first to K-th touch driving lines. The K may be a positive integer. The touch driver sequentially may output the touch driving signal to the first to K-th touch driving lines.

In an embodiment, the display panel may include data lines extending in a first direction. The first to K-th touch driving lines may extend in the first direction.

In an embodiment, the panel driver may include a gate driver configured to output a first to third write gate signal. The touch driving signal may have a same average voltage in a first time point, a second time point and a third time point. The first write gate signal is changed from an activation level to an inactivation level in the first time point. The second write gate signal is changed from the activation level to the inactivation level in the second time point. The third write gate signal is changed from the activation level to the inactivation level in the third time point.

In an embodiment, the same average voltage may be 0V.

In an embodiment of a method of driving a display apparatus according to the present inventive concept, the method includes outputting a panel driving signal to a display panel; determining a driving frequency of the display panel from the panel driving signal; generating a touch driving signal having a frequency synchronized with the driving frequency; and outputting a touch driving signal to a touch driving signal output layer of a touch panel.

In an embodiment, the frequency of the touch driving signal may be N times the driving frequency. The N may be a positive integer.

In an embodiment, the touch driving signal may have a sinewave function.

In an embodiment of a display system according to the present inventive concept, the display system includes a display panel, a panel driver configured to output a panel driving signal to the display panel, a touch driving signal output layer of a touch panel and a touch driver configured to determine a driving frequency based on the panel driving signal and output a touch driving signal to the touch driving signal output layer having a frequency synchronized to the driving frequency.

In an embodiment, the frequency of the touch driving signal may be N times the driving frequency. The N may be a positive integer.

In an embodiment, the display system may further include a touch sensing layer. The touch sensing layer may receive the touch element output signal from a touch element and may output touch element sensing data based on the touch element output signal to the touch driver.

In an embodiment, the panel driver may include a gate driver configured to output a first to third write gate signal. The touch driving signal may have a same average voltage in a first time point, a second time point and a third time point. The first write gate signal may be changed from an activation level to an inactivation level in the first time. The second write gate signal may be changed from the activation level to the inactivation level in the second time. The third write gate signal may be changed from the activation level to the inactivation level in the third time.

According to the display apparatus, the method of driving the display apparatus and the display system including the display apparatus, the horizontal line defect of the display panel and the stain defect of the display panel may be reduced by synchronizing the driving frequency of the display panel and the frequency of the touch driving signal. Thus, the display quality of the display panel may be enhanced.

BRIEF DESCRIPTION OF THE DRAWINGS

The above and other features of the present inventive concept will become more apparent by describing in detailed embodiments thereof with reference to the accompanying drawings, in which.

DETAILED DESCRIPTION

Figure 1:
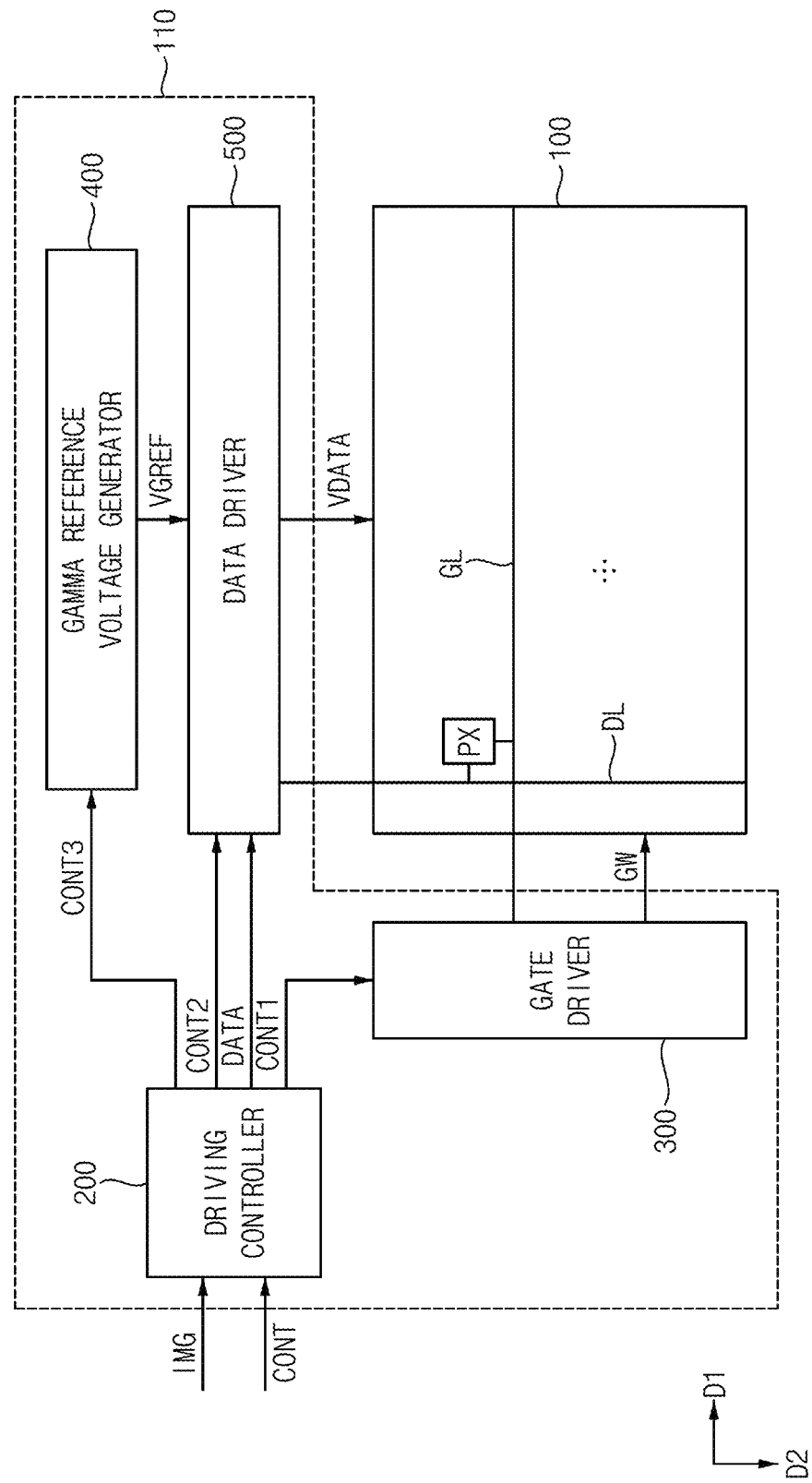
FIG. 1 is a block diagram illustrating a display apparatus according to an embodiment of the present inventive concept.

In the specification, the expression that a first component (or region, layer, part, portion, etc.) is "on", "connected with", or "coupled to" a second component means that the first component is directly on, connected with, or coupled to the second component or means that a third component is disposed therebetween. The same reference numeral refers to the same component. The expression "and/or" includes one or more combinations which associated components are capable of defining.

Hereinafter, the present inventive concept will be explained in detail with reference to the accompanying drawings.

FIG. 1 is a block diagram illustrating a display apparatus according to an embodiment of the present inventive concept.

Referring to FIG. 1, the display apparatus includes a display panel 100 and a panel driver 110 (e.g., a first driver circuit). In an embodiment, the panel driver 110 includes a gate driver 300 (e.g., a second driver circuit) configured to provide a write gate signal GW to the pixel PX, a gamma reference voltage generator 400, a data driver 500 (e.g., a third driver circuit) connected to the pixel PX through a data line DL and a driving controller 200 (e.g., a controller circuit) configured to control the gate driver 300, the gamma reference voltage generator 400 and the data driver 500.

In the present embodiment, the panel driver 100 outputs a panel driving signal to the display panel 100. The panel driving signal may determine a driving frequency of the display panel 100. For example, the panel driver 100 may set the panel driving signal such that the display panel 100 emits light at about 60 Hertz (Hz), 100 Hz, 120 Hz, etc. However, the present inventive concept is not limited to this driving frequency.

The display panel 100 may include at least one data line DL and at least one pixel PX connected to the data line DL. Additionally, the display panel 100 may further include at least one write gate line GL for providing a write gate signal GW to the pixel PX. For example, the display panel 100 may be an organic light emitting diode (OLED) display panel or a quantum dot (QD) display panel, but the present inventive concept is not limited thereto.

The display apparatus includes the display panel 100, the driving controller 200, the gate driver 300 and the data driver 500. In an embodiment, the driving controller 200 and the data driver 500 are integrally formed. For example, a single controller or driver may perform the functions of the driving controller 200 and the data driver 500 in certain embodiments.

The display panel 100 may have a display region on which an image is displayed and a peripheral region adjacent to the display region. In an embodiment, the gate driver 300 may be disposed in the peripheral region. In an embodiment, the gate driver 300 may be integrated in the peripheral region.

The display panel 100 may include a plurality of write gate lines GL, a plurality of data lines DL and a plurality of pixels PX connected to the write gate lines GL and the data lines DL. The write gate lines GL may extend in a first direction and the data lines DL may extend in a second direction crossing the first direction.

The driving controller 200 may receive input image data IMG and an input control signal CONT from an external apparatus (e.g. an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal. For example, the vertical synchronizing signal may indicate the start of a new frame and the horizontal synchronizing signal may indicate the start of new line with a frame.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the data signal DATA based on the input image data IMG. The driving controller 200 may output the data signal DATA to the data driver 500.

The gate driver 300 may generate write gate signals GW driving the gate lines GL in response to the first control signal CONT1 received from the driving controller 200. The gate driver 300 may output the write gate signals GW to the gate lines GL. For example, the gate driver 300 may sequentially output the gate signals to the gate lines GL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF may a value corresponding to each data voltage of the data signal DATA.

For example, the gamma reference voltage generator 400 may be disposed in the driving controller 200 or in the data driver 500.

The data driver 500 may receive the second control signal CONT2 and the data signal DATA from the driving controller 200 and may receive the gamma reference voltages VGREF from the gamma reference voltage generator 400. The data driver 500 may convert the data signal DATA into data voltages VDATA having an analog type using the gamma reference voltages VGREF. The data driver 500 may output the data voltages VDATA to the data lines DL.

In an embodiment, the data driver 500 may be implemented with one or more integrated circuits. In another embodiment, the data driver 500 and the driving controller 200 may be implemented as a single integrated circuit and the single integrated circuit may be referred to as a timing controller embedded data driver (TED).

Figure 2:
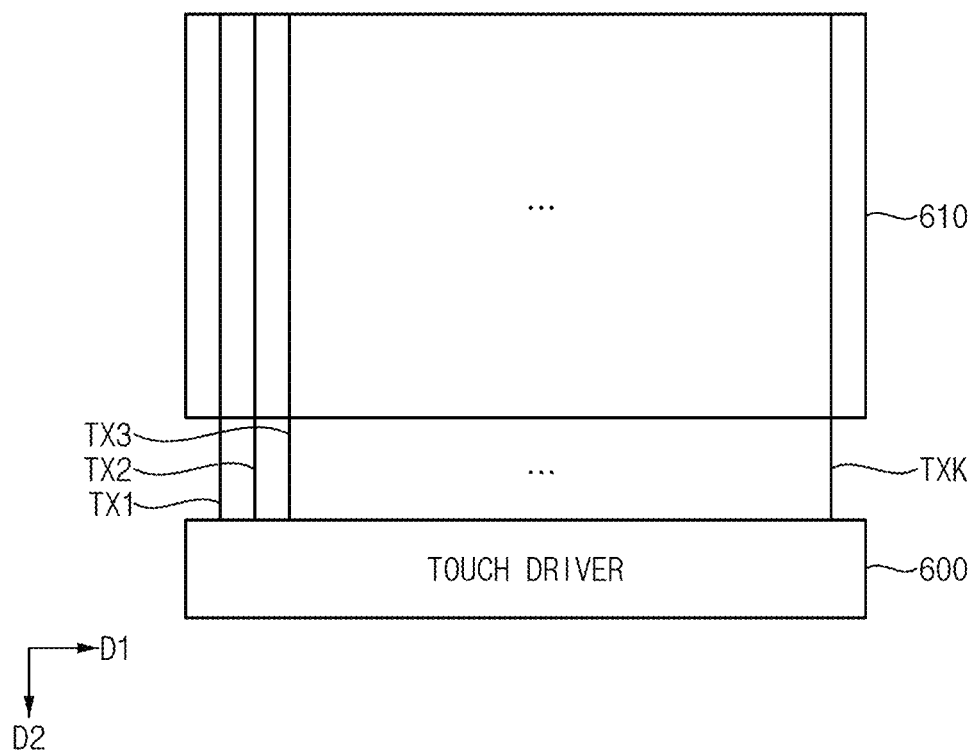
FIG. 2 is a block diagram illustrating a touch driver and a touch driving signal output layer included in the display apparatus of FIG. 1.

FIG. 2 is a block diagram illustrating a touch driver 600 (e.g., a driver circuit) and a touch driving signal output layer 610 included in the display apparatus of FIG. 1.

Referring to FIG. 1 and FIG. 2, the display apparatus may further include a touch driver 600 and the touch driving signal output layer 610.

In the present embodiment, the touch driving signal output layer 610 may include a first touch driving line TX1, a second touch driving line TX2, a third touch driving line TX3 to a K-th touch driving line TXK. Herein, the K may be a positive integer. The touch driver 600 may be connected to the touch driving signal output layer 610 through the first touch driving line TX1, the second driving line TX2, the third touch driving line TX3 to the K-th touch driving line TXK. The touch driver 600 may output the touch driving signal to the first touch driving line TX1, the second driving line TX2, the third touch driving line TX3 to the K-th touch driving line TXK.

In the present embodiment, the touch driver 600 may sequentially output the touch driving signal to the first touch driving line TX1, the second driving line TX2, the third touch driving line TX3 to the K-th touch driving line TXK.

In the present embodiment, the touch driving signal may have a frequency range between about 300 KHz and about 600 KHz. However, the present inventive concept is not limited this frequency range.

In an embodiment, the first to the K-th touch driving line TX1 to TXK may extend in a second direction D2. The data line DL may extend in the second direction D1. For example, the first to the K-th touch driving line TX1 to TXK and the data line DL may be extended in the same direction.

Figure 3:
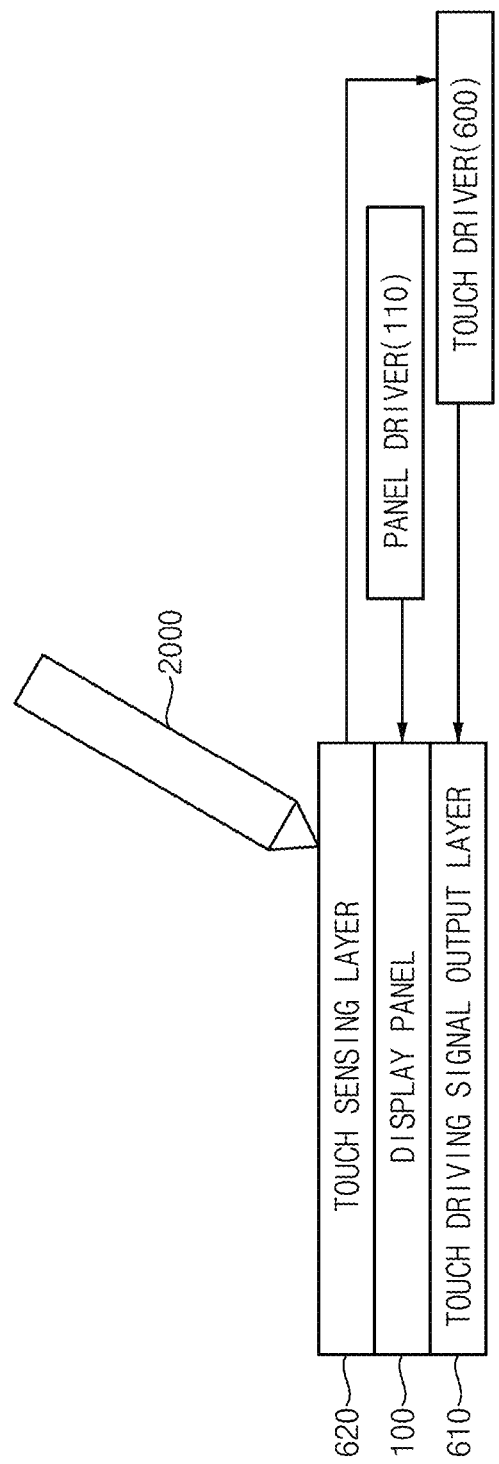
FIG. 3 is a block diagram illustrating a panel driver, a touch driver, a touch driving output layer, a display panel, a touch sensing layer and a touch element included in the display apparatus of FIG. 1.

FIG. 3 is a block diagram illustrating a panel driver 110, a touch driver 600, a touch driving output layer 610, a display panel 100 and a touch sensing layer 620 included in the display apparatus of FIG. 1 and a touch element 2000.

Referring to FIG. 1 to FIG. 3, the display apparatus may include the panel driver 110, the touch driver 600, the touch driving output layer 610, the display panel 100 and the touch sensing layer 620.

In the present embodiment, the display panel 100 may be disposed on the touch driving output layer 610. The touch sensing layer 620 may be disposed on the display panel 100.

The touch driving output layer 610 may receive the touch driving signal from the touch driver 600. The touch driving output layer 610 may include the first to the K-th touch driving line TX1 to TXK. The touch driving signal may be outputted to the first touch driving line TX1, the second driving line TX2, the third touch driving line TX3 to the K-th touch driving line TXK.

The display panel 100 may emit light at the driving frequency according to the panel driving signal received from the panel driver 110. For example, the driving frequency may be about 60 Hz, 100 Hz, 120 Hz, etc. However, the present inventive concept is not limited to the above described driving frequencies. For example, the display panel 100 may emit light corresponding to the driving frequency. For example, the display panel 100 may emit light at about 60 Hz, 100 Hz, 120 Hz, etc. For example, the display panel 100 may emit light at a variable frequency. In an embodiment, when the display panel 100 emits light at the variable frequency, a frequency of the touch driving signal is synchronized to the driving frequency. When the display panel 100 emits light at the variable frequency, the driving frequency may be changed in real time. Accordingly, when the display panel 100 emits light at the variable frequency, the frequency of the touch driving signal may be changed in real time. For example, the frequency of the touch driving signal may be changed whenever the frequency of the driving frequency is changed.

The touch element 2000 may be charged in response to the touch driving signal. The touch element 2000 may output a touch element output signal in response to the touch driving signal.

In an embodiment, the touch element 2000 has a pen shape. A pen electrode may be disposed at an end portion of the touch element 2000. For example, a portion of the pen electrode may be exposed outside of the touch element 2000 and a remaining portion of the pen electrode may be disposed inside the touch element 2000. For example, the touch element 2000 may be one of a stylus pen, an active pen, a touch pen and an electronic pen.

The touch sensing layer 620 may receive the touch element output signal from the touch element 2000. The touch sensing layer 620 may output touch element sensing information to the touch driver 600. For example, the touch element sensing information may include coordinates of a position of the touch element 2000 on the touch sensing layer 620. In an embodiment, the touch driving signal is not applied to a touch driving line in a period when the touch sensing layer 620 receives the touch element output signal. For example, a voltage of the touch driving line may be a direct-current (DC) voltage of 0V in the period when the touch sensing layer 620 receives the touch element output signal.

Figure 4:
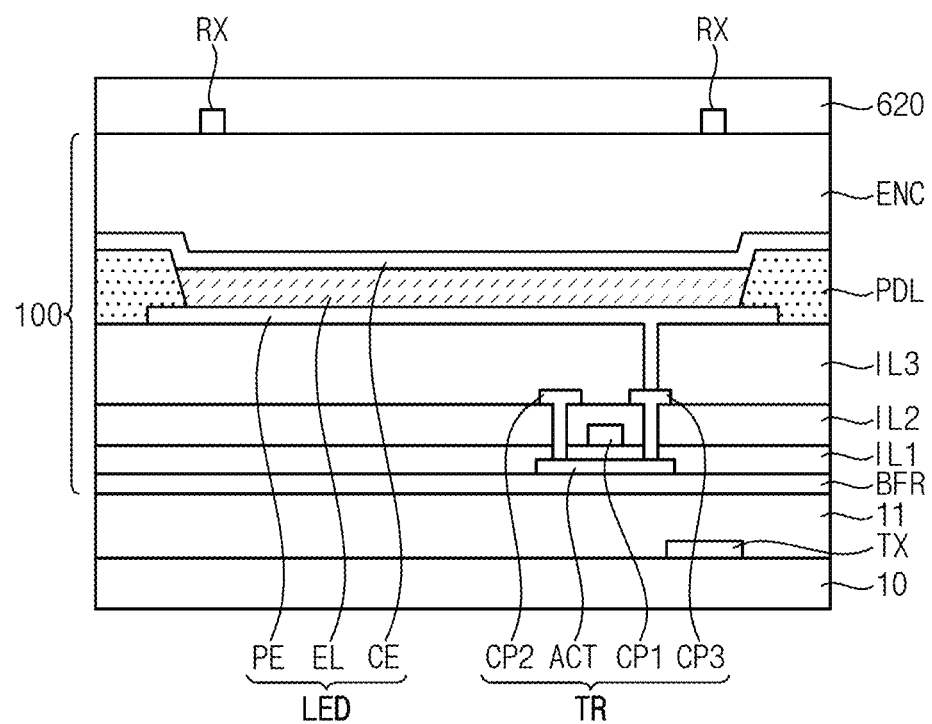
FIG. 4 is a cross-sectional view illustrating the touch driving signal output layer, the display panel and the touch sensing layer of FIG. 3.

FIG. 4 is a cross-sectional view illustrating the touch driving signal output layer 610, the display panel 100 and the touch sensing layer 620 of FIG. 3 according to an embodiment.

Referring to FIG. 3 to FIG. 4, the touch driving line TX may be disposed on a first layer 10. A second layer 11 may be disposed on the touch driving line TX. The second layer 11 may be disposed on the first layer 10. The display panel 100 may be disposed on the second layer 11. The touch sensing layer 620 may be disposed on the display panel 100. For example, the first layer 10 may be referred to as a first substrate. For example, the second layer 11 may be referred to as a second substrate. In the present embodiment, the first layer 10 and the second layer 11 may include or be an organic material with a high heat resistance and a high durability such as polyimide, polyethylene naphthalate, polyethylene terephthalate (PET), polyarylate, polycarbonate, polyetherimide (PEI) or polyethersulfone.

In the present embodiment, the touch driving line TX may be disposed under the display panel 100. Accordingly, the touch driving line TX may be more easily formed and process costs may be reduced.

In an embodiment, the display panel 100 includes a buffer layer BFR, first to third insulation layers IL1, IL2 and IL3, an active pattern ACT, first to third conductive patterns CP1, CP2 and CP3, a pixel defining layer PDL, a light emitting element LED and an encapsulation layer ENC. The active pattern ACT and the first to third conductive patterns CP1, CP2 and CP3 may form a transistor TR. The light emitting element LED may include a pixel electrode PE, a light emitting layer EL and a common electrode CE.

The buffer layer BFR may be disposed on the second layer 11. The buffer layer BFR may prevent impurities such as oxygen and water from diffusing into an upper part of the second layer 11. The buffer layer BFR may include an inorganic insulating material such as a silicon compound or metal oxide.

The active pattern ACT may be disposed on the buffer layer BFR. In an embodiment, the active pattern ACT includes or is a silicon semiconductor material includes or is an oxide semiconductor material.

In an embodiment, the first insulation layer IL1 is disposed on the buffer layer BFR. The first insulation layer IL1 may cover the active pattern ACT. In another embodiment, the first insulation layer IL1 is disposed as a pattern on the active pattern ACT to expose a portion of the active pattern ACT. For example, the first insulation layer IL1 may be disposed as a pattern on the active pattern ACT to overlap the first conductive pattern CP1. The first insulation layer IL1 may include or be an inorganic insulating material.

The first conductive pattern CP1 may be disposed on the first insulation layer IL1. In an embodiment, the first conductive pattern CP1 includes at least one of a metal, alloy, conductive metal oxides and a transparent conductive material.

The second insulation layer IL2 may be disposed on the first insulation layer IL1. In an embodiment, the second insulation layer IL2 covers the first conductive pattern CP1. The second insulation layer IL2 may include or be an inorganic insulating material.

The second conductive pattern CP2 and the third conductive pattern CP3 may be disposed on the second insulation layer IL2. The second conductive pattern CP2 and the third conductive pattern CP3 may be electrically connected to the active pattern ACT through a contact hole formed in the second insulation layer IL2. The second conductive pattern CP2 and the third conductive pattern CP3 may include or be at least one of metal, alloy, conductive metal oxides and a transparent conductive material.

The third insulation layer IL3 may be disposed on the second insulation layer IL2. For example, the third insulation layer IL3 may cover the second conductive pattern CP2 and the third conductive pattern CP3. The third insulation layer IL3 may include or be an inorganic insulating material.

The configuration, arrangement, and connection structure of the transistor TR and the plurality of insulation layers IL1, IL2, and IL3 shown in FIG. 4 are exemplary and may be changed in various ways. For example, the transistor TR may have a double-gate structure further including a fourth conductive pattern.

The pixel electrode PE may be disposed on the third insulation layer IL3. The pixel electrode PE may be electrically connected to the transistor TR through a contact hole formed in the third insulation layer IL3. In an embodiment, the pixel electrode PE includes or is at least one of metal, alloy, conductive metal oxides and a transparent conductive material.

The pixel defining layer PDL may be disposed on the third insulation layer IL3 and the pixel electrode PE. The pixel defining layer PDL may include an organic insulating material. In an embodiment, the pixel defining layer PDL further include a light blocking material. Examples of the light blocking material of the pixel defining layer PDL may be a black pigment and a black dye.

The pixel defining layer PDL may cover an edge of the pixel electrode PE and expose a portion of the pixel electrode PE.

The light emitting element LED may include the pixel electrode PE, the light emitting layer EL and the common electrode CE.

In an embodiment, the light emitting layer EL includes or is a light emitting material. For example, the light emitting layer EL may include an organic light emitting material. In an embodiment, functional layers such as a hole injection layer, a hole transport layer, an electron transport layer and an electron injection layer are additionally disposed on and/or under the light emitting layer EL. The common electrode CE may be disposed on the light emitting layer EL. The common electrode CE may include or be at least one of metal, alloy, conductive metal oxides and a transparent conductive material. In an embodiment, the common electrode CE extends continuously across a plurality of the pixels.

The encapsulation layer ENC may be disposed on the light emitting element LED. The encapsulation layer ENC may protect the light emitting element LED from external moisture, heat, shock, etc. The encapsulation layer ENC may include a first inorganic encapsulation layer, an organic encapsulation layer disposed on the first inorganic encapsulation layer and a second inorganic encapsulation layer disposed on the organic encapsulation layer.

In the present embodiment, the touch sensing layer 620 may include a touch sensing line RX. For example, the touch sensing line RX may receive the touch element output signal and output the touch element sensing data to the touch driver 600. The touch sensing line RX may sense the coordinates of the position of the touch element 2000 and output the coordinates of the position to the touch driver 600.

In an embodiment, the touch sensing line RX has a mesh shape. However, the present inventive concept is not limited to this shape.

Figure 5:
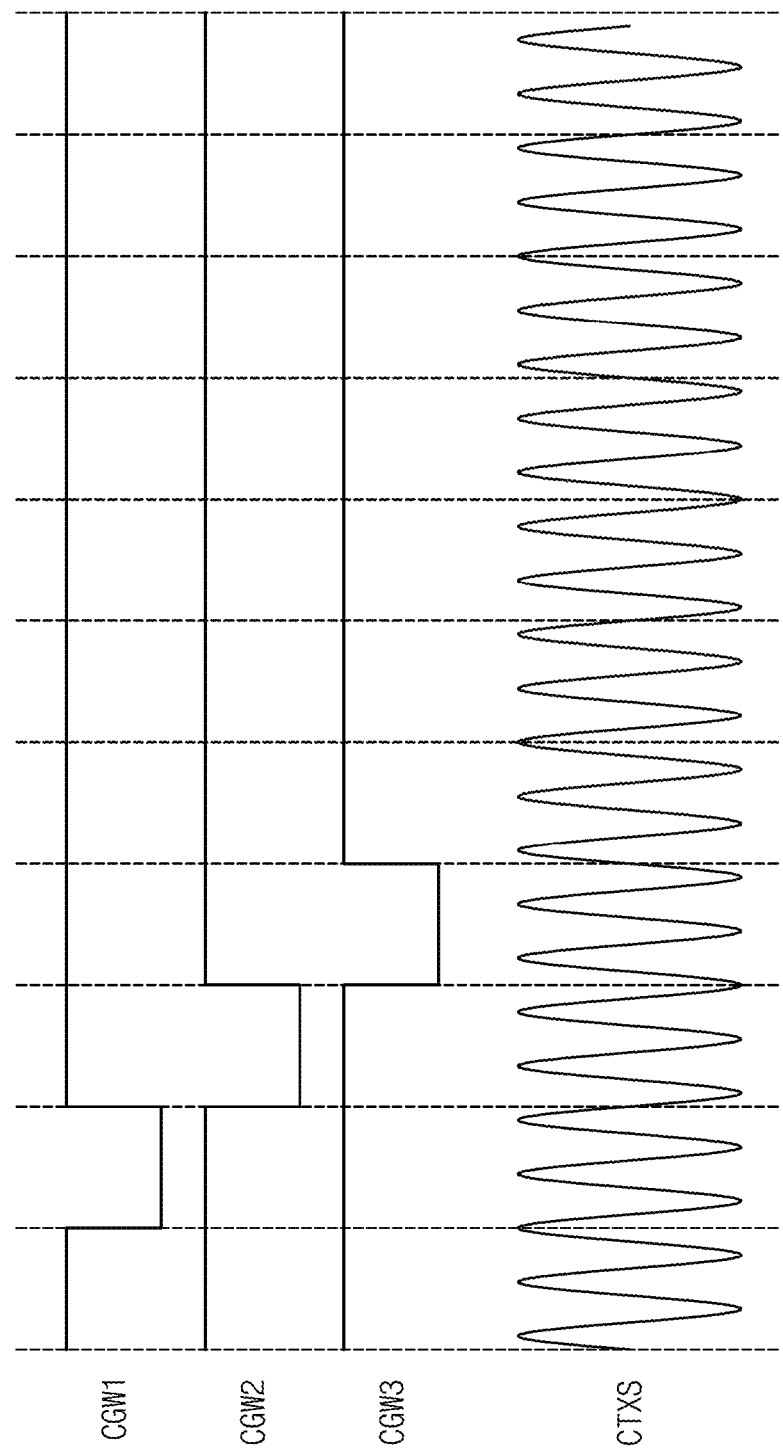
FIG. 5 is a timing diagram illustrating a driving signal applied to a touch driving signal output layer of FIG. 3 and a display apparatus of FIG. 1 according to a comparative embodiment.
Figure 6:
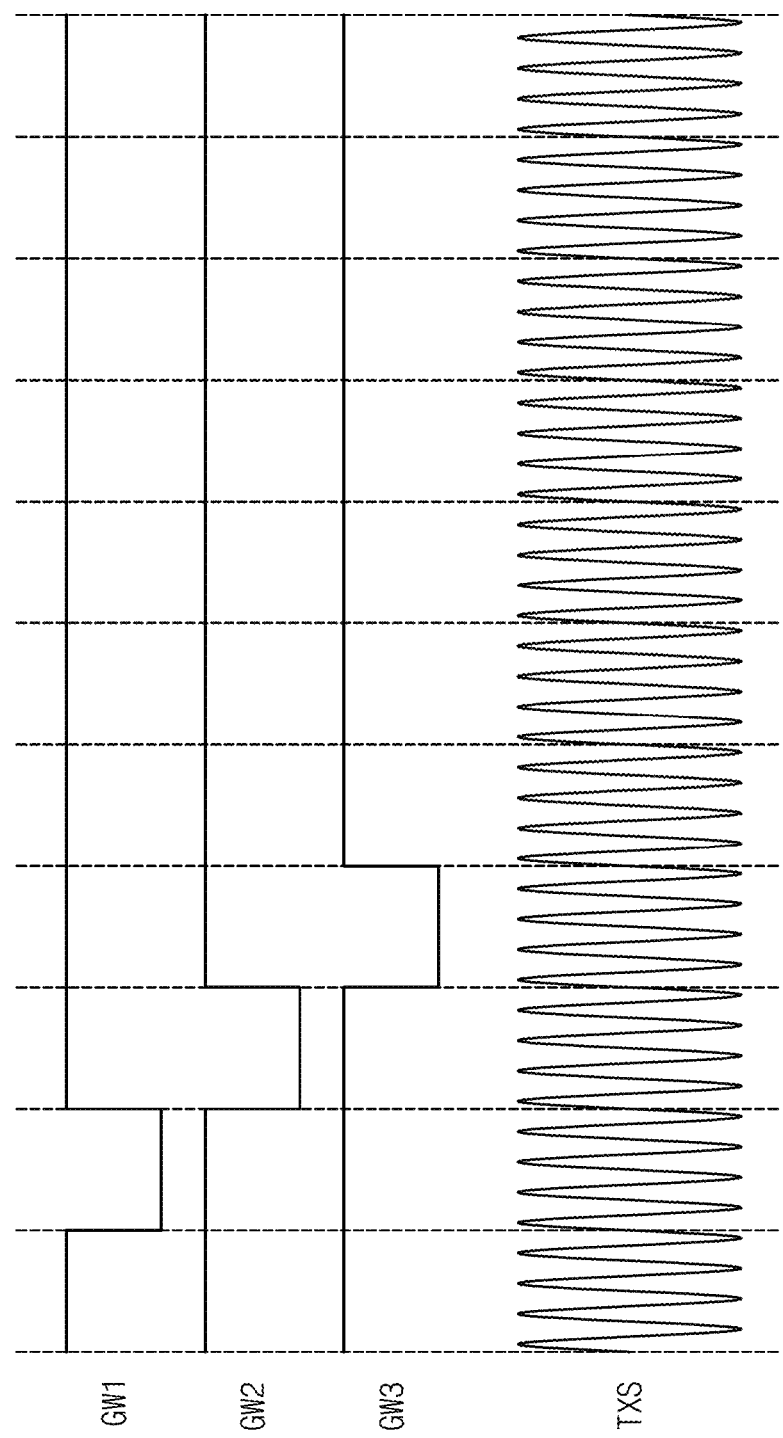
FIG. 6 is a timing diagram illustrating a driving signal according to the embodiments of the present inventive concept applied to a touch driving signal output layer of FIG. 3 and a display apparatus of FIG. 1.

FIG. 5 is a timing diagram illustrating a driving signal applied to a touch driving signal output layer 610 of FIG. 3 and a display apparatus of FIG. 1 according to a comparative embodiment. FIG. 6 is a timing diagram illustrating a driving signal according to the embodiments of the present inventive concept applied to a touch driving signal output layer 610 of FIG. 3 and a display apparatus of FIG. 1.

Referring to FIG. 4 to FIG. 6, in the present embodiment, the touch driving signal TXS may be synchronized to the driving frequency of the display panel 100. For example, when the panel driving signal is set to drive the display panel 100 at about 120 Hz, a frequency of the touch driving signal TXS may be a multiple of about 120 Hz. The frequency of the touch driving signal TXS may be N times the frequency of 120 Hz. Herein the N may be a positive integer. For example, when the display panel 100 is driven at about 120 Hz, the frequency of the touch driving signal TXS may be about 480 KHz. Additionally, for example, when the display panel 100 is driven at about 120 Hz, the frequency of the touch driving signal TXS may be about 600 KHz.

The touch driving line TX may be disposed under the display panel 100. Accordingly, the touch driving signal TXS outputted to the touch driving line TX may cause interference with the data voltage VDATA applied to the display panel 100. For example, the touch driving signal TXS may have a periodic function or be a periodic signal. The touch driving signal TXS may have the periodic function, so that the touch driving signal TXS is coupled to the data voltage VDATA applied to the data line DL of the display panel 100. The coupling between the touch driving signal TXS and the data voltage VDATA may vary according to the area of the display panel 100. Accordingly, the charging rate of the data voltage VDATA may vary. Accordingly, a display quality of the display panel 100 may be reduced. For example, a horizontal line defect or stain defect of the display panel 100 may be observed.

In this comparative embodiment, the frequency of the panel driving signal and the frequency of the comparative touch driving signal CTXS are unsynchronized. Accordingly, a horizontal line defect or stain defect of the display panel 100 may occur more frequently.

For example, a display panel of this comparative embodiment may receive a first comparative write gate signal CGW1, a second comparative write gate signal CGW2, a third comparative write gate signal CGW3 and the comparative touch driving signal CTXS.

The comparative touch driving signal CTXS may have a first comparative touch driving voltage in a time where the first comparative write gate signal CGW1 changes from an activation level to an inactivation level. The comparative touch driving signal CTXS may have a second comparative touch driving voltage different from the first comparative touch driving voltage in a time where the second comparative write gate signal CGW2 changes from an activation level to an inactivation level. The comparative touch driving signal CTXS may have a third comparative touch driving voltage different from the first comparative touch driving voltage and the third comparative touch driving voltage in a time where the first comparative write gate signal CGW1 changes from an activation level to an inactivation level.

Accordingly, the first comparative touch driving voltage, the second comparative touch driving voltage and the third comparative touch driving voltage may be different. Accordingly, the data voltage VDATA may be changed to different voltage by coupling. Accordingly, a horizontal line defect or a stain defect of the display panel 100 of the comparative embodiment may be observed.

In contrast, in the present embodiment, the frequency of the touch driving signal TXS is synchronized to the driving frequency of the display panel 100. In the present embodiment, the touch driving signal TXS has a periodic function or is a periodic signal. Additionally, in the present embodiment, the periodic function may be a sinewave function. The periodic signal may be a sinewave.

For example, the display panel 100 may receive a first write gate signal GW1, a second write gate signal GW2, a third write gate signal GW3 and the touch driving signal TXS.

In a first time, the first write gate signal GW1 may be changed from the activation level to the inactivation level. In a second time, the second write gate signal GW2 may be changed from the activation level to the inactivation level. In a third time, the third write gate signal GW3 may be changed from the activation level to the inactivation level. In the present embodiment, the activation level of the write gate signals GW1, GW2 and GW3 may be a logic low level and the inactivation level of the write gate signals GW1, GW2 and GW3 may be a logic high level. In an embodiment, the activation level of the write gate signals GW1, GW2 and GW3 may be the logic high level and the inactivation level of the write gate signals GW1, GW2 and GW3 may be the logic low level.

In the present embodiment, the touch driving signal TXS may have a same voltage in the first time, the second time and the third time. Accordingly, when the data voltage VDATA applied to the display panel 100 is coupled to the touch driving signal TXS, the data voltage VDATA may be uniformly changed by the same voltage. Accordingly, the horizontal line defect or the stain defect of the display panel 100 may be reduced. As shown in FIG. 6, the touch driving signal TXS may be continuously in phase with or in sync with all the activation periods, whereas the comparative touch driving signal CTXS is not in phase with or not in sync with all the activation periods. For example, a first pulse of the touch driving signal TXS starts at a same time in each activation period as shown in FIG. 6, whereas a first pulse of the comparative touch driving signal CTXS occurs at different times within each activation period. Here an activation period is a time during which a write gate signal has the activation level.

In an embodiment, the touch driver 600 receives the vertical start signal. In an embodiment, the touch driver 600 outputs the touch driving signal TXS based on the vertical start signal. In an embodiment, the touch driver 600 receives the first control signal CONT1 from the driving controller 200, determines the frequency of the display panel 100 from the vertical start signal included within the first control signal CONT1, and generates the touch driving signal TXS to be in sync with the frequency of the display panel 100. For example, the touch driver 600 may set the frequency of the touch driving signal TXS to be a multiple of the frequency of the display panel 100. In an embodiment, the touch driver 600 generates the touch driving signal TXS to be a periodic signal such as a sine wave so its first pulse starts in response to an edge of the vertical start signal that indicates a beginning of a frame. In another embodiment, the touch driver 600 receives the vertical synchronizing signal, determines the frequency of the display panel 1000 from the vertical synchronizing signal and generates the touch driving signal TXS to be in sync with the frequency of the display panel 100.

In an embodiment, the touch driving signal TXS may have about 0V in the first time, the second time and the third time. For example, the average voltage of the touch driving signal TXS may be 0V. Accordingly, the horizontal line defect or the stain defect of the display panel 100 may be more reduced.

Figure 7:
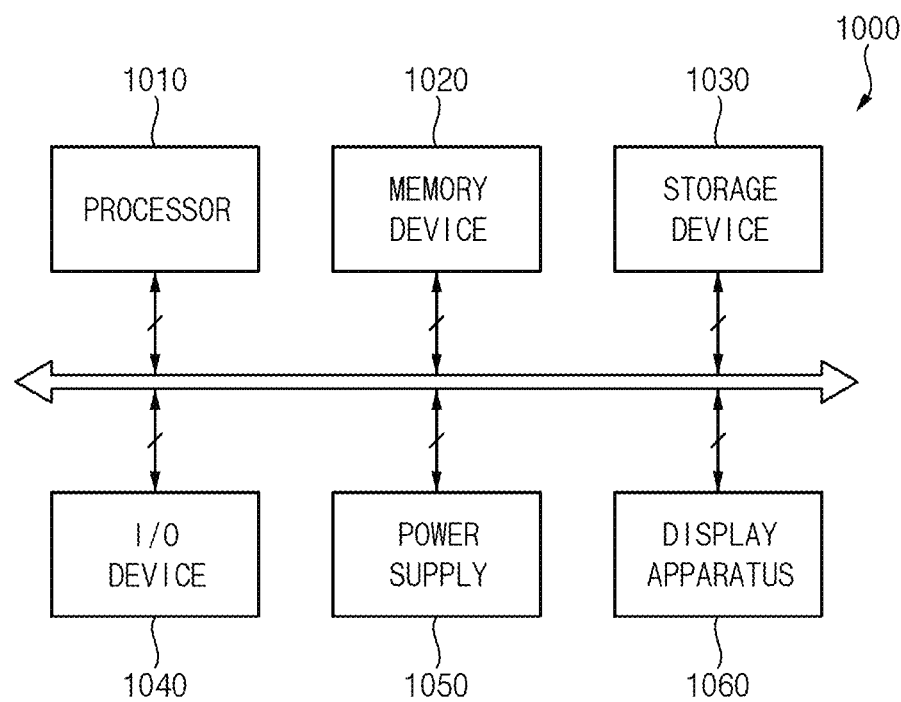
FIG. 7 is a block diagram illustrating an electronic apparatus according to an embodiment of the present inventive concept.
Figure 8:
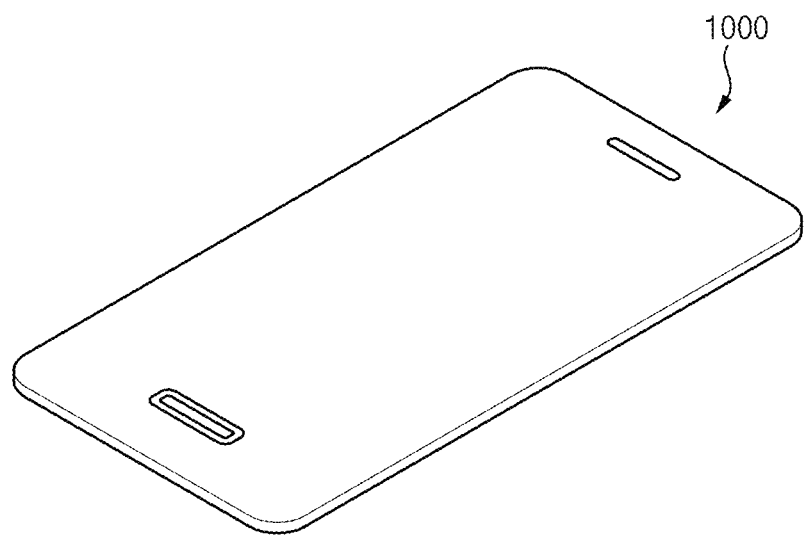
FIG. 8 is a diagram illustrating an example in which the electronic apparatus of FIG. 7 is implemented as a smart phone.

FIG. 7 is a block diagram illustrating an electronic apparatus according to an embodiment of the present inventive concept. FIG. 8 is a diagram illustrating an example in which the electronic apparatus of FIG. 7 is implemented as a smart phone.

Referring to FIGS. 7 and 8, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 8, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Although the electronic apparatus of the present inventive concept is implemented as a smart phone in FIG. 8, the present inventive concept is not limited thereto. For example, the electronic apparatus may be a television, a monitor, a laptop computer or a tablet PC. Alternatively, the electronic apparatus may be a vehicle.

According to the display apparatus, the method of driving the display apparatus and the display system including the display apparatus in the present inventive concept, the horizontal line defect of the display panel and the stain defect of the display panel may be reduced due to its synchronizing of the driving frequency of the display panel with the driving frequency of the touch driving signal.

The foregoing is illustrative of the present inventive concept and is not to be construed as limiting thereof. Although a few embodiments of the present inventive concept have been described, those skilled in the art will readily appreciate that many modifications are possible in the embodiments without materially departing from present inventive concept. Accordingly, all such modifications are intended to be included within the scope of the present inventive concept.

What is claimed is:

1. A display apparatus comprising:
    a display panel;
    a panel driver configured to output a panel driving signal to the display panel, the panel driver including a gate driver configured to output a plurality of sequential gate write signals to the display panel;
    a touch driving signal output layer of a touch panel; and
    a touch driver configured to output a touch driving signal to the touch driving signal output layer,
    wherein the display apparatus determines a driving frequency associated with the plurality of sequential gate write signals of the display panel from the panel driving signal, and
    wherein the display apparatus synchronizes a frequency of the touch driving signal with the driving frequency, and each of the plurality of sequential gate write signals has a transition, from an inactivation level to an activation level, at a respective time aligned with a same phase point of the touch driving signal.

2. The display apparatus of claim 1, wherein the frequency of the touch driving signal is N times the driving frequency, and
wherein the N is a positive integer.

3. The display apparatus of claim 1, wherein the display panel is disposed on the touch driving signal output layer.

4. The display apparatus of claim 3, further comprising a touch sensing layer,
wherein the touch sensing layer is disposed on the display panel.

5. The display apparatus of claim 1, wherein the touch driving signal has a periodic function.

6. The display apparatus of claim 5, wherein the periodic function is a sinewave function.

7. The display apparatus of claim 1, wherein the touch driving signal output layer includes a touch driving line, and
wherein the touch driver outputs the touch driving signal to the touch driving line.

8. The display apparatus of claim 7, further comprising a first layer and a second layer,
wherein the touch driving line is disposed on the first layer, and
wherein the second layer is disposed on the touch driving line.

9. The display apparatus of claim 8, wherein the first layer and the second layer include an organic material.

10. The display apparatus of claim 1, wherein the touch driving signal output layer includes first to K-th touch driving lines,
wherein the K is a positive integer, and
wherein the touch driver is configured to sequentially output the touch driving signal to the first to K-th touch driving lines.

11. The display apparatus of claim 10, wherein the display panel includes data lines extending in a first direction, and
wherein the first to K-th touch driving lines extend in the first direction.

12. The display apparatus of claim 1, wherein the panel driver includes a gate driver configured to output first to third write gate signals,
wherein the touch driving signal has a same average voltage in a first time point, a second time point and a third time point,
wherein the first write gate signal is changed from an activation level to an inactivation level in the first time point,
wherein the second write gate signal is changed from the activation level to the inactivation level in the second time point, and
wherein the third write gate signal is changed from the activation level to the inactivation level in the third time point.

13. The display apparatus of claim 12, wherein the same average voltage is 0V.

14. A method of driving a display apparatus, the method comprising:
outputting a panel driving signal to a display panel;
outputting a plurality of sequential gate write signals to the display panel;
determining a driving frequency of the display panel, associated with the plurality of sequential gate write signals from the panel driving signal;
generating a touch driving signal having a frequency synchronized with the driving frequency; and
outputting the touch driving signal to a touch driving signal output layer of a touch panel,
wherein each of the plurality of sequential gate write signals has a transition, from an inactivation level to an activation level, at a respective time aligned with a same phase point of a of the touch driving signal.

15. The method of claim 14, wherein the frequency of the touch driving signal is N times the driving frequency, and
wherein the N is a positive integer.

16. The method of claim 14, wherein the touch driving signal has a sinewave function.

17. An electronic device comprising:
a display apparatus, comprising:
a display panel;
a panel driver configured to output a panel driving signal to the display panel, the panel driver including a gate driver configured to output a plurality of sequential gate write signals to the display panel;
a touch driving signal output layer of a touch panel; and
a touch driver configured to determine a driving frequency, associated with the plurality of gate write signals, based on the panel driving signal and output a touch driving signal to the touch driving signal output layer having a frequency synchronized to the driving frequency, and each of the plurality of sequential gate write signals has a transition, from an inactivation level to an activation level, at a respective time aligned with a same phase point of the touch driving signal.

18. The electronic device of claim 17, wherein the frequency of the touch driving signal is N times the driving frequency, and
wherein the N is a positive integer.

19. The electronic device of claim 17, further comprising a touch sensing layer,
wherein the touch sensing layer is configured to receive the touch element output signal from a touch element and to output touch element sensing data based on the touch element output signal to the touch driver.

20. The electronic device of claim 17, wherein the panel driver includes a gate driver configured to output first to third write gate signals,
wherein the touch driving signal has a same average voltage in a first time point, a second time point and a third time point,
wherein the first write gate signal is changed from an activation level to an inactivation level in the first time point,
wherein the second write gate signal is changed from the activation level to the inactivation level in the second time point, and
wherein the third write gate signal is changed from the activation level to the inactivation level in the third time point.

* * * * *